United States Patent [19]

Hatanaka et al.

[11] Patent Number: 5,680,558
[45] Date of Patent: Oct. 21, 1997

[54] MULTIMEDIA FILE MANAGEMENT IN WHICH SPECIALIZED ICONS CAN BE CREATED FOR DIFFERENT FILE TYPES

[75] Inventors: Koji Hatanaka, Yokohama; Hideo Takiguchi, Kawasaki; Takashi Aizawa, Yokohama; Fumiaki Takahashi, Machida; Akira Mamiya, Yokohama; Kenji Hatori, Hatogaya, all of Japan

[73] Assignee: Canon Kabushiki Kaisha, Tokyo, Japan

[21] Appl. No.: 354,113

[22] Filed: Dec. 6, 1994

[30] Foreign Application Priority Data

Dec. 9, 1993 [JP] Japan ................... 5-309295

[51] Int. Cl.⁶ .................................. G06F 17/30
[52] U.S. Cl. ............... 395/334; 395/326; 395/333; 364/DIG. 1
[58] Field of Search ................ 364/514; 395/154, 395/155, 159, 161, 600, 604, 326, 333, 334

[56] References Cited

U.S. PATENT DOCUMENTS

| | | | |
|---|---|---|---|
| 5,136,655 | 8/1992 | Bronson | 381/41 |
| 5,257,349 | 10/1993 | Alexander | 395/159 |
| 5,321,800 | 6/1994 | Lesser | 395/140 |
| 5,367,626 | 11/1994 | Morioka et al. | 395/159 |
| 5,414,808 | 5/1995 | Williams | 395/154 |
| 5,448,375 | 9/1995 | Cooper et al. | 358/403 |
| 5,467,288 | 11/1995 | Fasciano et al. | 364/514 |

FOREIGN PATENT DOCUMENTS

| | | |
|---|---|---|
| 1-120598 | 5/1989 | Japan. |
| 3-011482 | 1/1991 | Japan. |
| 3-127269 | 5/1991 | Japan. |
| 5-108774 | 4/1993 | Japan. |

OTHER PUBLICATIONS

Rowe, S., "Business Telecommunications", 1988 pp. 119, 138.

Primary Examiner—Thomas G. Black
Assistant Examiner—John C. Loomis
Attorney, Agent, or Firm—Fitzpatrick, Cella Harper & Scinto

[57] ABSTRACT

There are disclosed a method and system for managing a file that allows an operator to easily select, specify, and manage a multimedia file (including audio data, text, still image, moving image, etc.) via a display screen. The type of a file is identified. If the file is an audio data file, then an icon is generated with an image representing an amplitude waveform or a frequency distribution waveform of the audio data, or, the icon is generated with an image including a color or a pattern preassigned to the frequency distribution or both. If the file is a text file, then an icon is generated with an image representing an arbitrary area of an arbitrary page of the text file. If the file is a still image file, then an icon is generated with an image obtained by reducing an arbitrary area of the still image. If the file is a moving image file, then an icon is generated with an image obtained by reducing an arbitrary area of an arbitrary scene of the moving image.

48 Claims, 11 Drawing Sheets

MULTIMEDIA FILE MANAGEMENT IN WHICH SPECIALIZED ICONS CAN BE CREATED FOR DIFFERENT FILE TYPES

BACKGROUND OF THE INVENTION

1. Field of the Invention

The present invention relates to a method and system for managing a file that allows an operator to easily select or specify a file (documents, audio information, still pictures, animations, movies, etc.) via a display screen of an electronic apparatus such as a computer, word processor, or electronic filing system.

2. Description of Related Art

In conventional computer techniques, file management is a basic function provided by an operating system or a GUI (graphical user interface) of windowing software, in which a file type is designated by a file name extension (file identifier) or otherwise an icon is assigned in common to a group of files having the same extension. However, there is no known method of indicating the contents of individual files on icons so that an operator can easily understand the contents.

In the case of a text (document) file, for example, the content of the file designated by an icon has to be guessed from a file name or title of the file displayed together with the icon. In the case of an audio file, the type of icon assigned to the file is determined by the coding method by which audio signals included in the file have been encoded or by the type of application associated with the audio file, and thus it is difficult to know the content of the file via the icon. To view the contents of a file, one must start an application program corresponding to the type of each file represented by its extension. This operation takes a long time to display contents of a file, on a display screen especially a file that has a huge amount of data, for example, an image data file.

SUMMARY OF THE INVENTION

In view of the above, it is an object of the present invention to provide a method and system for managing files, in which the image of an icon includes information extracted from the content of a file designated by the icon, thereby representing the content of the file so that the file can be easily identified.

According to an aspect of the present invention, there is provided a file management system comprising: characteristic feature extraction means for extracting inherent characteristic features of data; icon generating means for generating an icon that designates a file including the data wherein the icon is based on the extracted characteristic features; icon management means for managing the icon corresponding to the file; displaying means for displaying the icon; and selection means for selectively designating an arbitrary file displayed on the displaying means.

According to another aspect of the present invention, there are provided a method and system for managing a file, in which a file is managed via an image in the form of an icon including characteristic features extracted from the file so that the file can be easily identified, wherein an image itself in the case of an image data file, an envelope audio signal (an envelope waveform of amplitude peaks of audio signal) in the case of an audio data file, or frequency distribution is employed as the characteristic feature.

These and other objects, features and advantages of the invention will be more fully understand from the following detailed description of the preferred embodiments, taken together with the accompanying drawings.

DESCRIPTION OF THE PREFERRED EMBODIMENTS

Referring to the accompanying drawings, preferred embodiments of the invention will be described in detail below.

Figure 1:
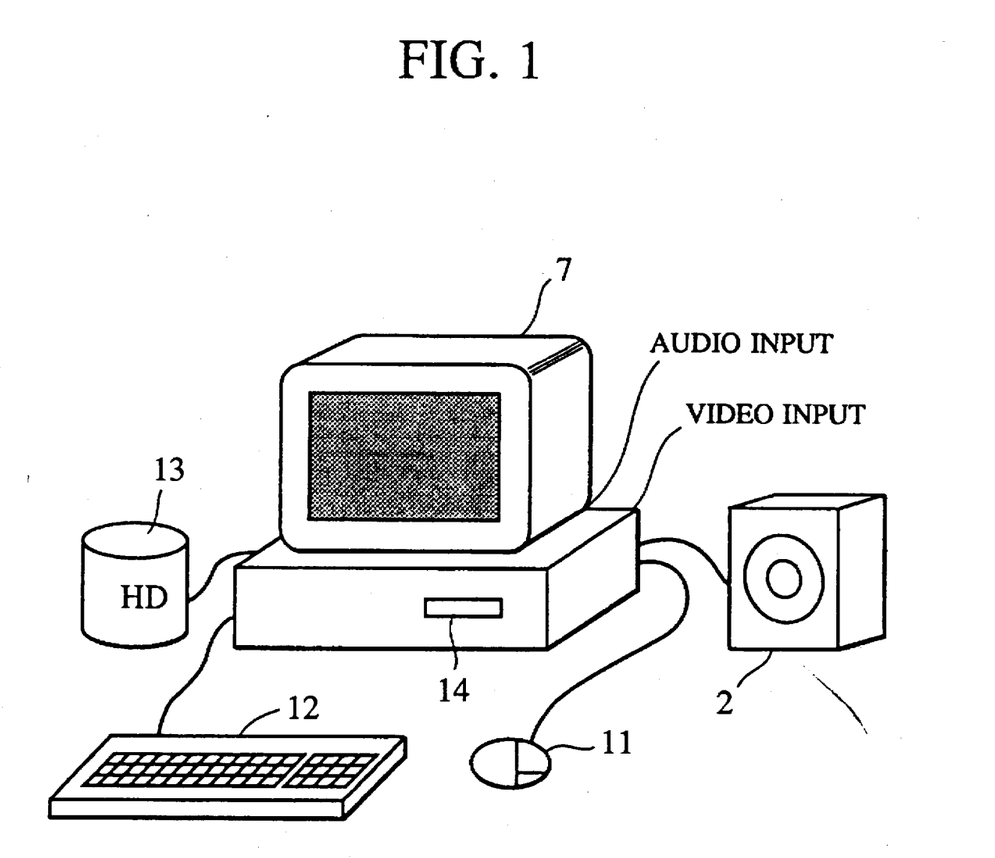
FIG. 1 is a schematic diagram illustrating the outline of a system according to the present invention.
Figure 2:
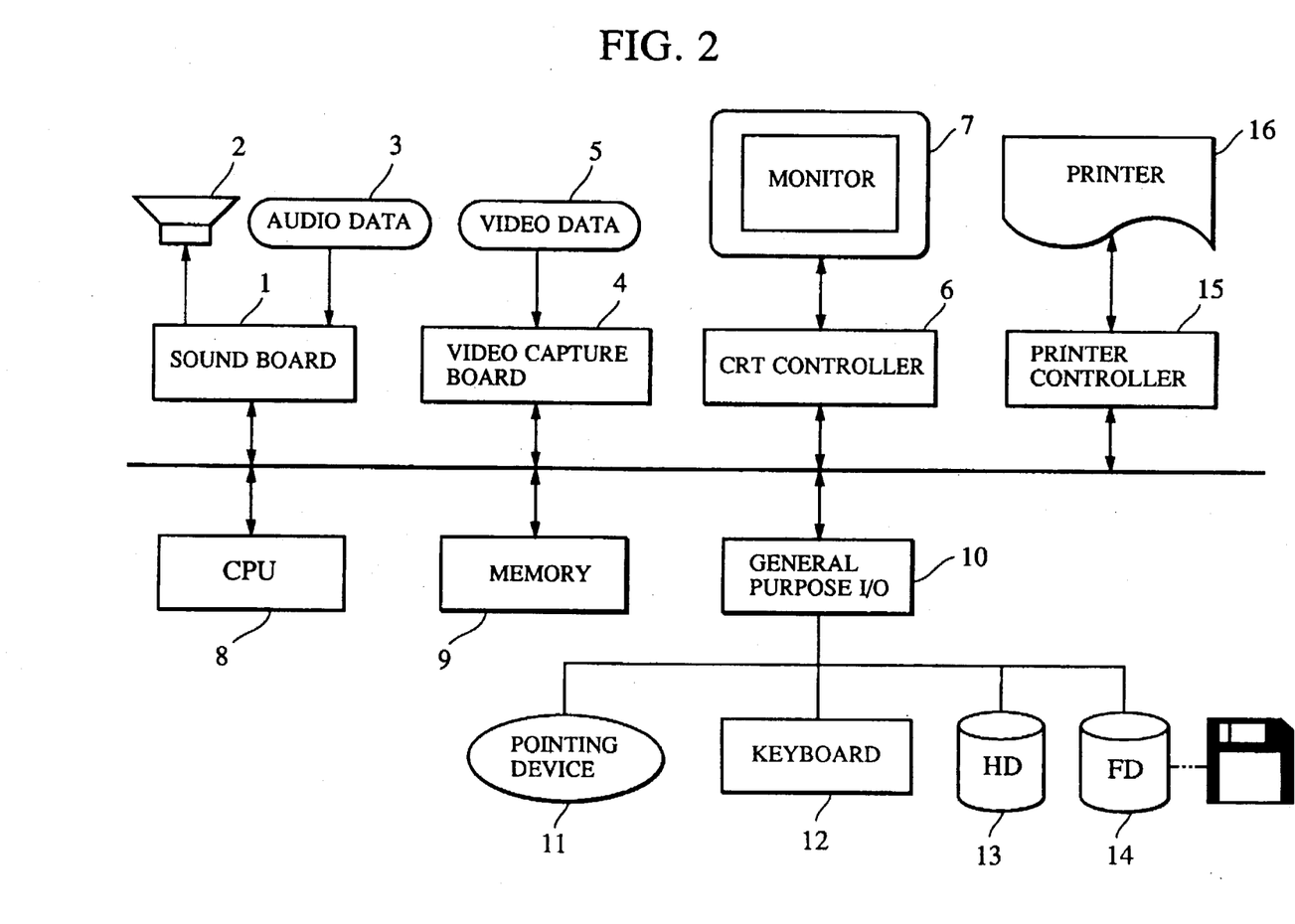
FIG. 2 is a block diagram illustrating an example of the configuration of a system according to the present invention.

FIG. 2 is a block diagram illustrating an example of a multimedia file management system according to the present invention, wherein the outline of this system is shown in FIG. 1. This system comprises: a central processing unit (CPU) 8 serving as a controller; internal memory 9 including ROM and RAM serving as memory; and external storage devices including a hard disk (HD) device 13 and a floppy disk (FD) device 14 for storing various data and programs for controlling the system or a program associated with control processing described later in connection with FIG. 10. The system also comprises: a pointing device 11 and a keyboard 12 serving as a user interface hardware that allows a user to input information into the system wherein these elements 11 and 12 are connected to the system via a general purpose input/output interface 10; a monitor 7 for providing visual data to the user wherein the monitor 7 is connected to the system via a CRT controller 6; and a printer 16 for outputting data connected to the system via a printer controller 15. The system further comprises a sound board 1 and video capture board 4 including analog-to-digital and digital-to-analog converters for inputting and outputting various types of data. A loudspeaker 2 for outputting an audio signal is connected to the sound board 1.

Figure 3:
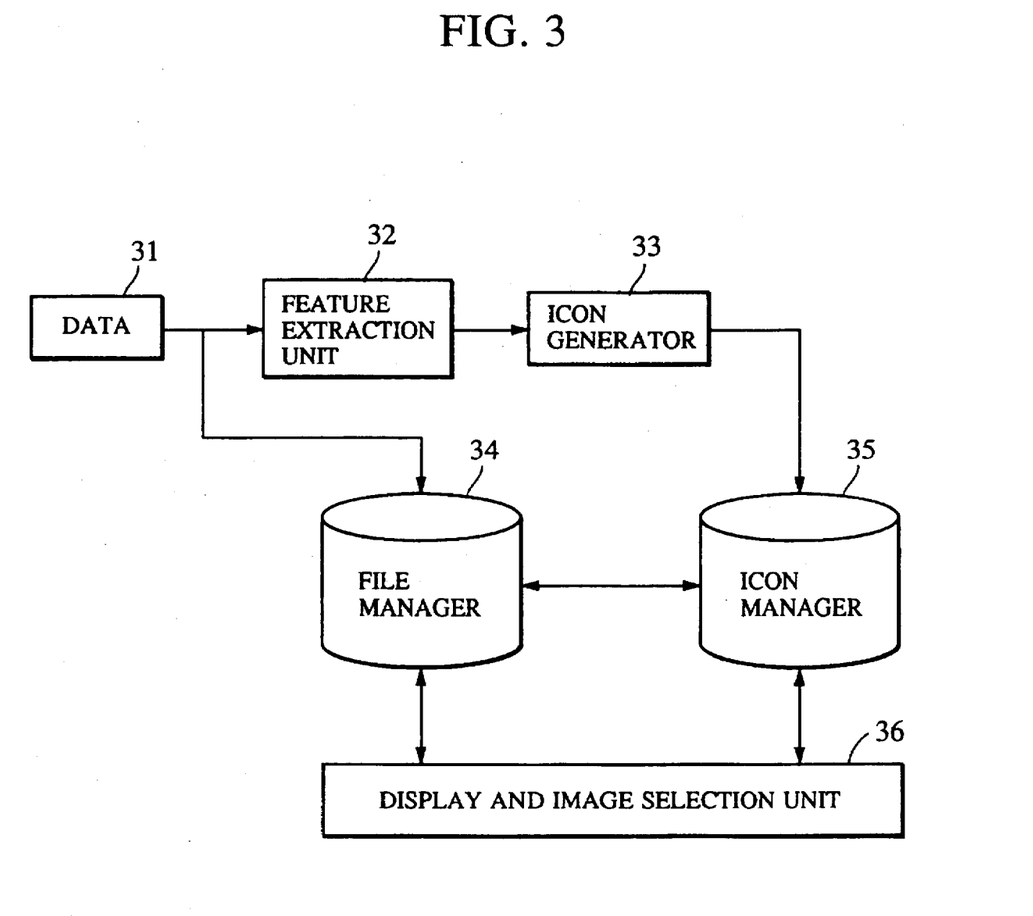
FIG. 3 is a block diagram illustrating an embodiment according to the present invention.

FIG. 3 illustrates an example of a general configuration of a multimedia file management system according to the present invention. In FIG. 3, a characteristic feature extraction unit 32 extracts characteristic features of input data 31 and creates a reduced-size image used as an icon. The methods of extracting characteristic features and creating a reduced-size image differ depending on the types of individual input data, as will be described in detail later. The characteristic feature extraction unit 32 operates under the control of a program associated with control processing shown in the flow chart of FIG. 10 wherein the program is stored in the internal memory 9, as will also be described later. An icon generator 33 is controlled by a program (not shown) so that it designates the generated reduced-size image as an icon image of the input data, and provides the reduced-size image to an icon manager 35. Under the control of a program (not shown), the icon manager 35 manages the reduced-size image acting as the icon image assigned to the data. When an icon is selected via the display and selection unit 36, the icon manager 35 determines a file that corresponds to the selected icon, and informs a file manager about the result. The file manager 34, under the control of a program (not shown), stores data 31 applied to the system in the form of a file on a storage device such as the hard disc device 13, and manipulates a specified file in response to a request. In this system, files are related to icons in a one-to-one fashion. The display and selection unit 36 displays characters, graphic images, or pictures. The display and selection unit 36 also has an input device for selecting a part of displayed images or characters. More specifically, the display and selection unit 36 includes for example a monitor 7 and a pointing device 11. In the present embodiment, a file name or a title is displayed together with an icon on the display and selection unit 36. Now, the operation of the characteristic feature extraction unit 32 will be described in more detail below.

Figure 4A:
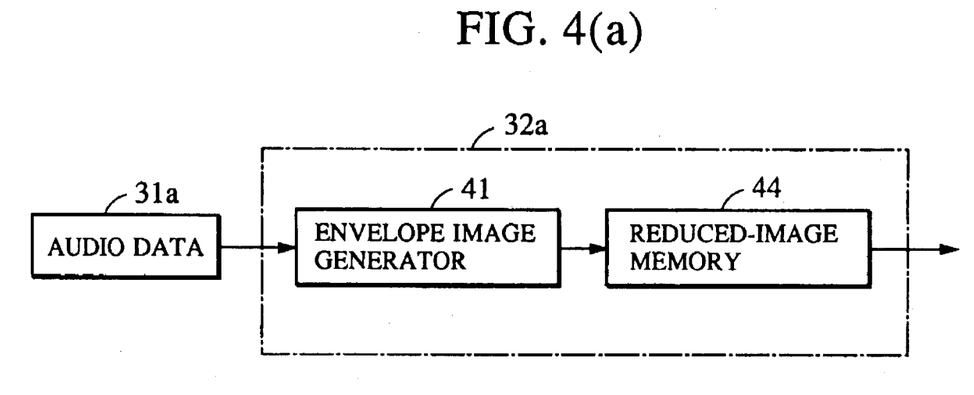
FIGS. 4(a) and 4(b) are block diagrams illustrating embodiments of a characteristic feature extraction unit shown in FIG. 3 according to the present invention.
Figure 4B:
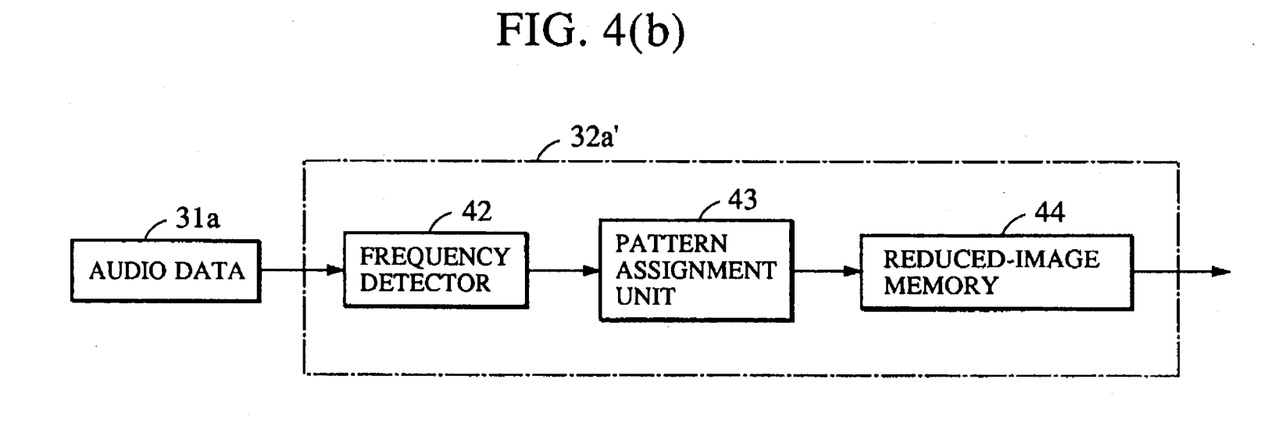

When the data 31 applied to the system is audio data representing only audio information, the characteristic features of the data can be extracted by a characteristic feature extraction unit 32 configured in such a manner as shown in FIGS. 4(a) and 4(b) (32a and 32a', respectively).

Figure 6A:
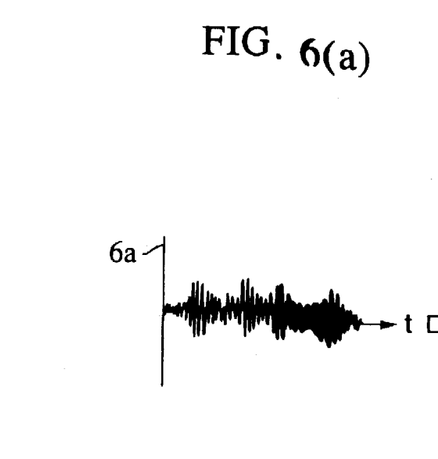
FIGS. 6(a), 6(b), 6(c) and 6(d) are schematic diagrams illustrating a method of displaying an audio waveform.
Figure 6B:
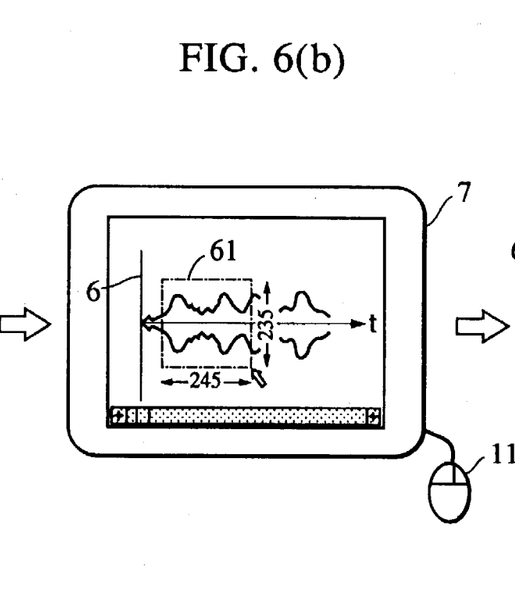
Figure 6C:
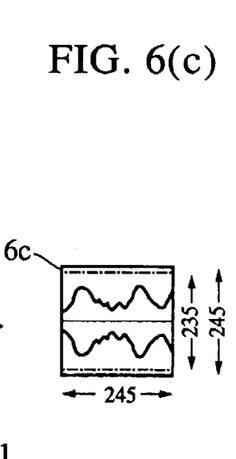
Figure 6D:
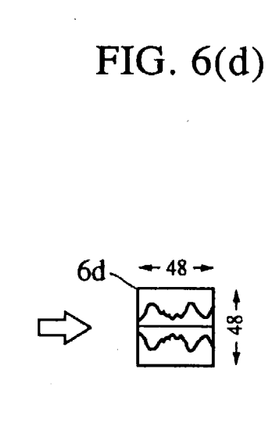
Figure 9:
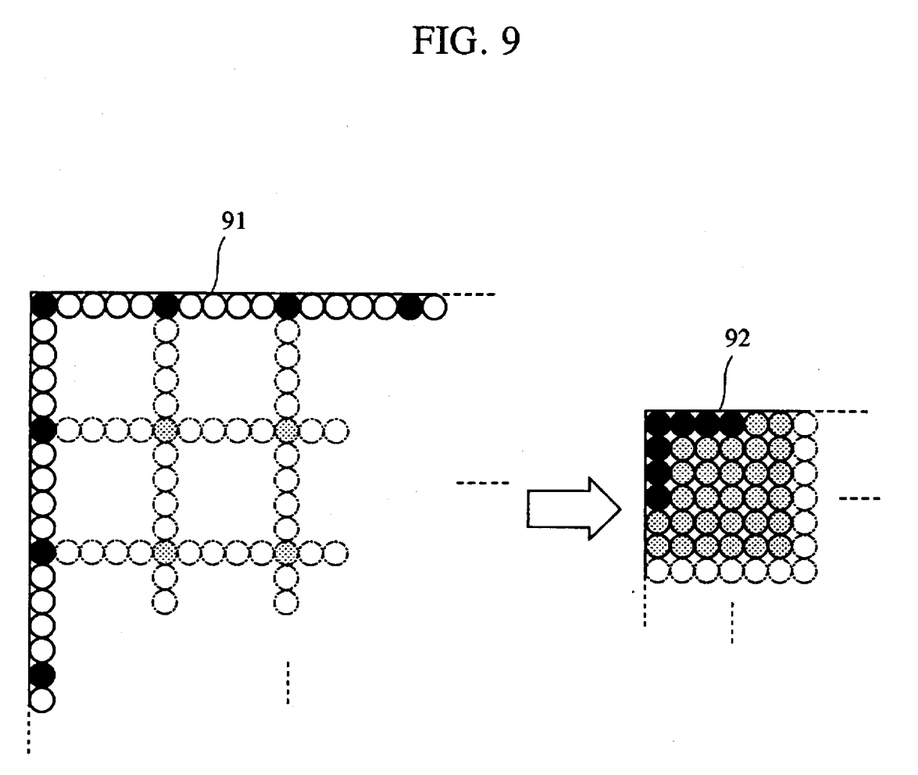
FIG. 9 is a schematic diagram illustrating a method of generating a reduced image from bit-mapped data.

When a reduced-size image used as an icon is desired to be generated based on an audio waveform, such an image can be generated by an arrangement such as that shown in FIG. 4(a). In FIG. 4(a), an envelope image generator 41 generates a reduced-size image data from an amplitude waveform, sound pressure waveform, or frequency distribution waveform of an arbitrary part of applied digital audio data 31a, and then stores the obtained image data in a reduced-image memory area 44 in the internal memory 9. FIG. 6 illustrates a method of generating a reduced-size image from an amplitude waveform according to the present embodiment of the invention. In this system, it is assumed that a reduced-size image used as an icon is 48×48 pixels in size. FIG. 6(a) illustrates an amplitude waveform of audio data. The envelope image generator displays, on the monitor 7, a waveform composed of envelope lines connecting maximum and minimum peak points of the waveform of FIG. 6(a) as shown in FIG. 6(b). An operator specifies and selects an area of the displayed waveform via the pointing device 11. Then, a reduced-size image corresponding to the selected area 61 is generated (FIG. 6(d)). If a size of the selected area 61 is for example, 235×245 pixels (height× width), the reduced-size image is generated as follows. To create a square icon, for example, dummy space areas are added to the upper and lower portions of the selected area 61 so that an image 6c of 245×245 pixels is formed. Alternatively, the characteristic feature extraction unit may also be designed to automatically select an area of 245×245 pixels. Since 245÷48=5 (with a remainder of 5), if the values are extracted every five pixels in both vertical and horizontal directions from the original image 91, then a reduced-size image 92 is formed as shown in FIG. 9. If this method is applied to the image 6c, then a reduced-size image 6d is obtained. The data of the reduced-size image 6d is then stored in the reduced-size memory area 44 in the internal memory 9.

Figure 7A:
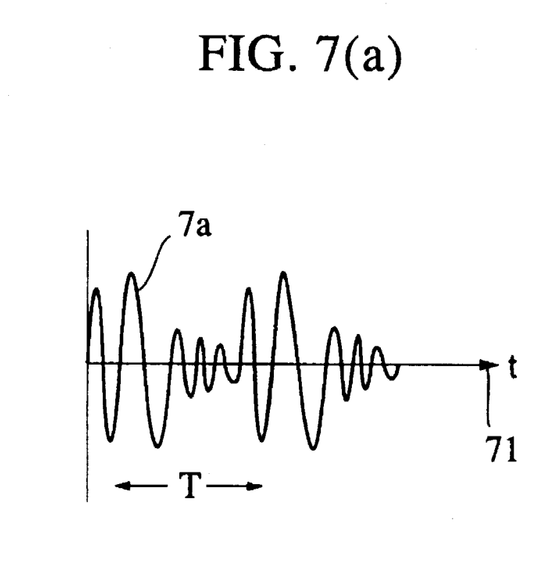
FIGS. 7(a), 7(b) and 7(c) are schematic diagrams illustrating a method of determining the pitch of an audio signal.
Figure 7B:
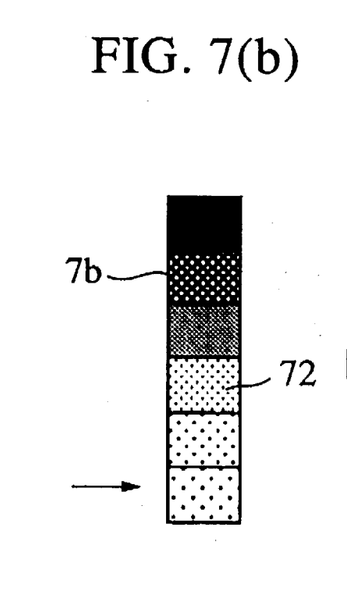
Figure 7C:
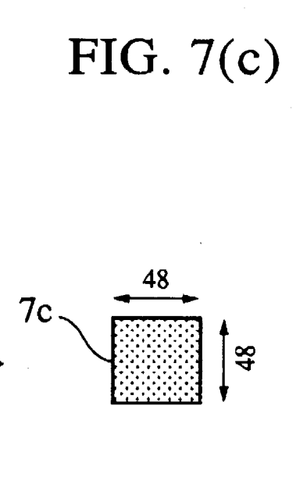

FIG. 4(b) is a block diagram illustrating an arrangement according to another embodiment for realizing a method of generating an icon image including patterns with various brightness corresponding to the frequencies of an audio signal. In FIG. 4(b), a frequency detector 42 detects a frequency of digital audio data 31a and provides the detected result to a pattern assignment unit 43. In this embodiment, the amplitude waveform 7a of an audio signal such as that as shown in FIG. 7(a) is examined and the number of times the amplitude waveform 7a crosses the horizontal axis (time axis) 71 is counted during a predetermined constant time period T. Based on the count, the frequency of the audio signal is determined, and the result is output as a parameter to the pattern assignment unit 43. The pattern assignment unit 43 generates a reduced-size image composed of colors or patterns that are preassigned to corresponding frequencies according to the parameter given by the frequency detector 42. The data of the reduced-size image is stored in the reduced-image memory area 44 of the internal memory 9. In this embodiment, a pattern is selected from a pattern table shown in FIG. 7(b) according to the frequency detected by the frequency detector 42, and this selected pattern is used as a base pattern 72 of a reduced-size image to be generated. Using the base pattern 72, bit-mapped data associated with the image 7c having 48×48 pixels is generated, and the result is stored in the reduced-image memory 44. In this embodiment, two types of icon images, an icon formed with a reduced-size image representing an audio signal waveform and an icon formed with a reduced-size image of a preassigned pattern corresponding to the frequency of an audio signal, can be generated. If desired, these two types of images may be combined into one reduced-size image.

After the completion of the above processing, the data stored in the reduced-image memory area 44 in the internal memory is transferred as icon image data to the icon generator 33.

With the processing described above, a reduced-size image for an icon that reflects the characteristic features of an audio data 31a is generated.

Figure 5:
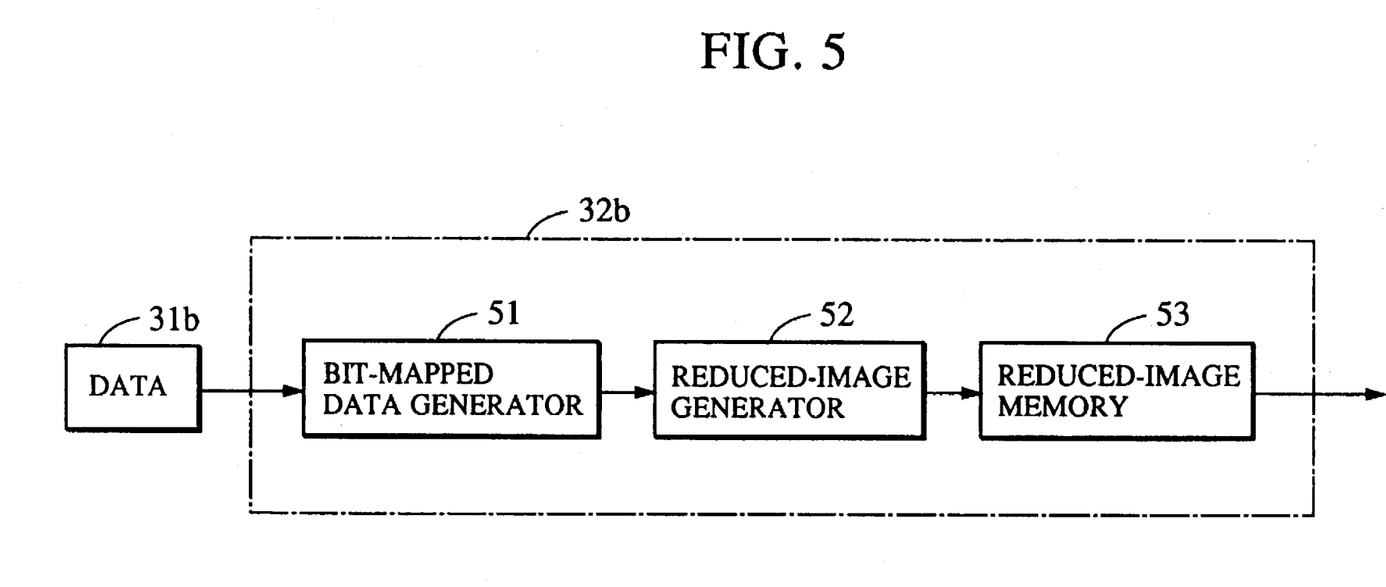
FIG. 5 is a block diagram illustrating another embodiment of the characteristic feature extraction unit shown in FIG. 3 according to the present invention.
Figure 8A:
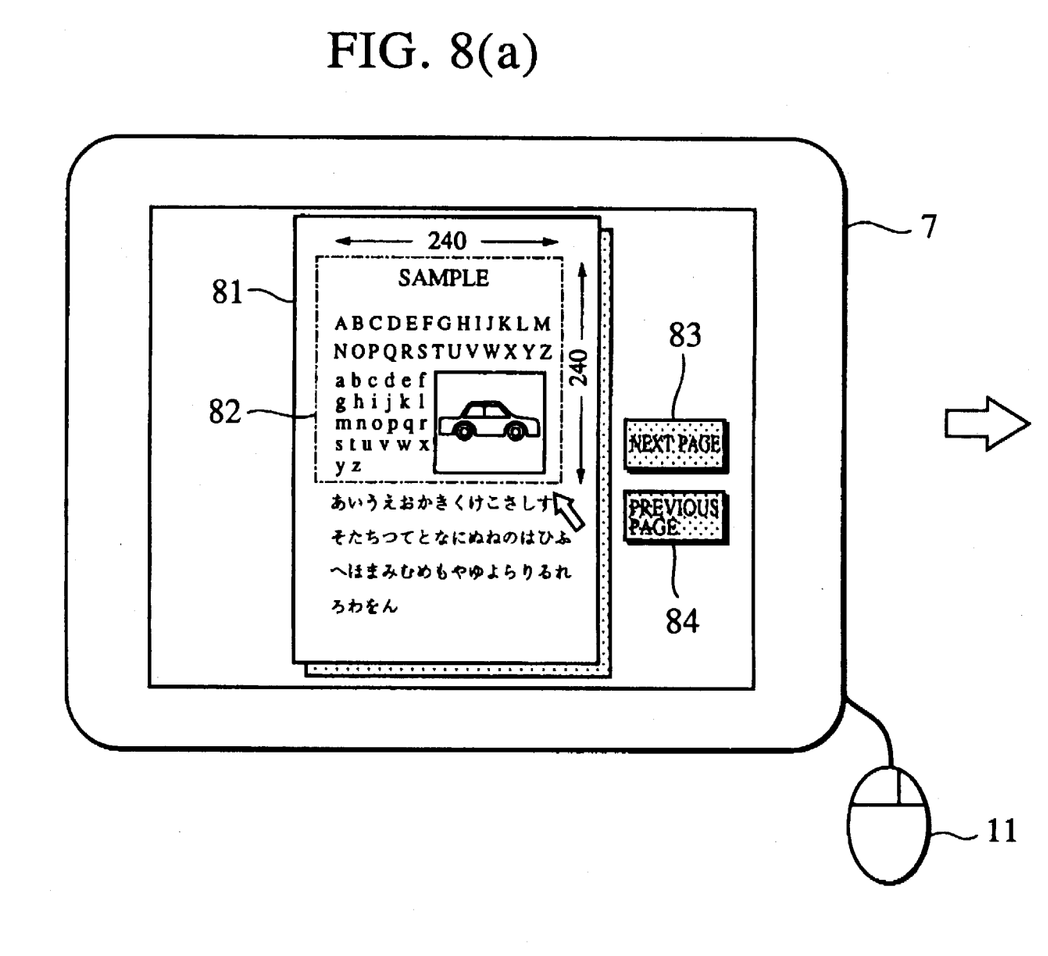
FIGS. 8(a) and 8(b) are schematic diagrams illustrating a method of reducing the size of a document.
Figure 8B:
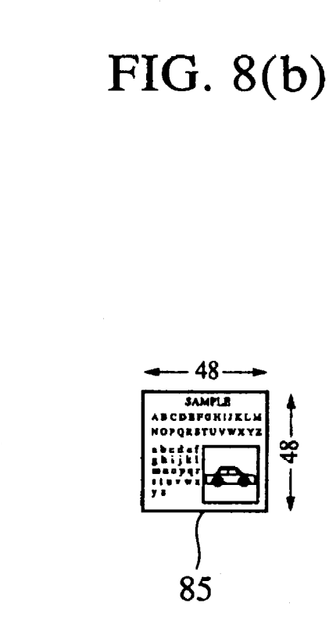

On the other hand, when a document or an image is applied as the input data 31 to the system, the characteristic feature extraction unit 32 used for such data can be implemented in such a manner described by block 32b in FIG. 5. This characteristic feature extraction unit 32b shown in FIG. 5 can deal with various types of data, that is, data solely of a document, data solely of an image (a still image and a graphics image), data of both a document and an image, and other types of multimedia data. A moving image such as an animation or a movie can also be dealt with as image data by specifying an arbitrary area of an arbitrary scene of the animation or movie. In FIG. 5, a bit-mapped data generator 51 runs in the background a software application program that has generated data 31b so as to display the first page of the data 31b on the monitor 7 (FIG. 8(a)). An operator specifies and selects an area to be incorporated into an icon image via the pointing device 11. If a page other than the first page is desired to be designated for an icon image, that page may be specified by clicking either a "NEXT PAGE" button 83 or a "PREVIOUS PAGE" button 84, thereby displaying a particular page on the monitor via the application program running in the background. An arbitrary area of that page may then be specified via the pointing device 11. The bit-mapped data generator 51 generates a bit-mapped data associated with the specified area and stores the resultant data in a bit-mapped data area in the memory. A reduced-image generator 52 generates reduced-size image data having a small size suitable for an icon by extracting a part of the image data stored in the bit-mapped data area in the memory and stores the resultant reduced-size image data in a reduced-image memory area 53. For example, a reduced-size image for an icon may be generated from an arbitrary area of a document having an A-4 standard size according to the procedure described below. Here, it is assumed that the size of an icon image is 48×48 pixels. First, an arbitrary area of document is specified via the pointing device 11 as described above (FIG. 8(a)). Then, bit-mapped data associated with the specified area 82 is generated. In this embodiment, the specified area 82 is assumed to include 240 10×240 pixels. However an area of arbitrary size may be selected. Furthermore, the area is not limited to a rectangular shape. A reduced-size image including 48×48 pixels is generated from the specified area as follows. Since 240÷48= 5, a reduced-size image can be generated by extracting pixel values at intervals of five pixels in both vertical and horizontal directions from the selected area as shown in FIG. 9. Thus, a reduced-sized image 85 such as that shown in FIG. 8(b) is obtained. The resultant data is stored in the reduced-image memory 53. The data stored in the reduced-image memory 53 is transferred as the icon image data to the icon generator 33.

With the processing described above, a reduced-size image for an icon that reflects the characteristic features of data 31b is generated.

Figure 10:
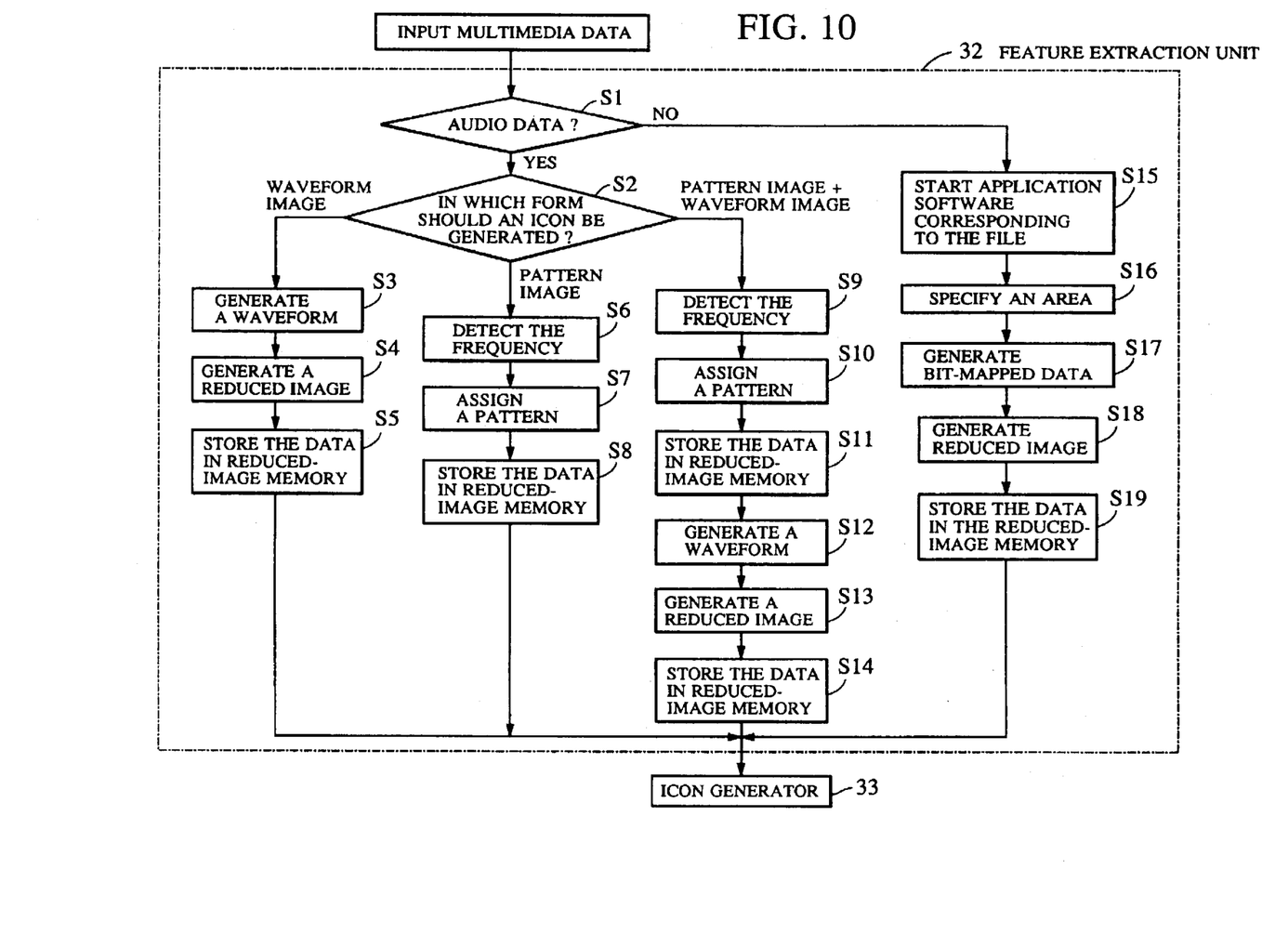
FIG. 10 is a flow chart illustrating the operation of the embodiment of the characteristic feature extraction unit shown in FIG. 3.

Referring to the flow chart of FIG. 10, the operation of the above characteristic feature extraction unit 32 will be described below.

First, at step S1, whether multimedia data applied to the system is audio data or not is determined from data described in a header portion of the applied multimedia data. If the data is audio data, then the process proceeds to step S2. In the other case, the process proceeds to step S15. That is, if the applied multimedia data is either a document or image data or the like, the data is processed in the steps from S15 through S19. In step S15, an application program that has created the multimedia data is started so that the first page of the multimedia data is displayed on the monitor 7 via the display and selection unit 36. In step S16, an operator specifies an arbitrary area of the image displayed on the monitor via the pointing device 11 so that the specified area will be used to generate an icon image. Then, the process proceeds to step S17, in which bit-mapped data associated with the specified area is generated. The process proceeds to step S18 in which bit-mapped data of a reduced-size image is generated from the bit-mapped data generated in step S17. The resultant data is stored in the reduced-image memory 44 in step S19. If the applied multimedia data is instead audio data, the data is processed in steps from S2 through S14. In step S2, the form of an icon image to be generated is determined first. If an audio waveform image has been selected to generate an icon image, the process proceeds to step S3. An audio waveform is generated according to the above-described method in step S3, and a reduced-size image is then generated in step S4. In step S5, the data of the reduced-size image generated in the step S4 is stored in the reduced-image memory 44. On the other hand, when a pattern image has been selected to generate an icon image, the process proceeds to step S6. In step S6, the frequency of applied audio data is detected. In step S7, a reduced-size image is generated using a pattern preassigned to the frequency as described above. In step S8, the data of the reduced-size image generated in step S7 is stored in the reduced-image memory 44. When a combination of an audio waveform and a background pattern image has been selected to generate an icon, the process proceeds to step S9. The steps from S9 through S11 are the same as the steps from S6 through S8, and the steps from S 12 through S13 are the same as the steps from S3 through S4. It should be noted that when the reduced-size image data generated in step S13 is stored in the reduced-image memory in step S14, the data that has been stored in the reduced-image memory in step S11 should be preserved so that the data of the bit-mapped data of the audio waveform may be combined with the data stored previously in the reduced-image memory 44. In the present embodiment, the form of a reduced-size image is determined in step S2. However the form may also be preassigned, or may be determined by an operator for each image.

Figure 11:
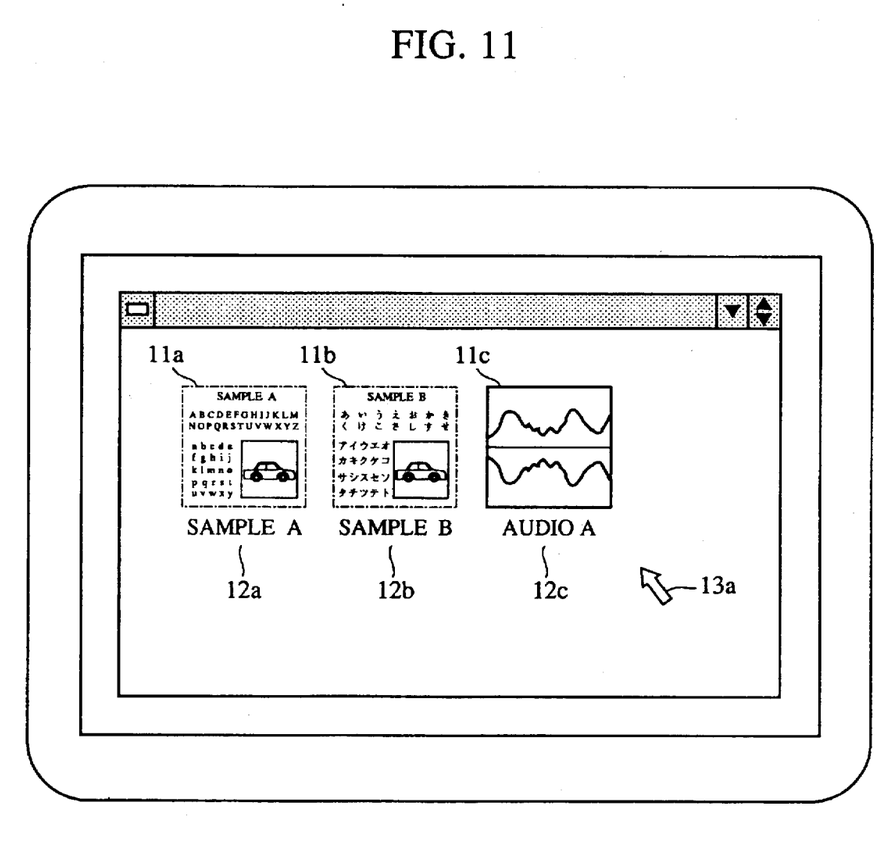
FIG. 11 is a schematic diagram illustrating an example of an image displayed on a display screen according to one embodiment of the present invention.

FIG. 11 illustrates some examples of icon images for multimedia data, that are generated according to the method described above and displayed on the monitor screen. As shown in FIG. 11, icons 11a, 11b, and 11c reflect the contents of each multimedia data. Furthermore, titles or file names 12a, 12b, and 12c are also displayed on the monitor screen. An operator can select an arbitrary file by pointing and clicking a corresponding icon with a pointer 13a of the pointing device thereby starting the selected file itself or running an application program related to it.

Although the present invention and its advantages have been described in detail with reference to specific preferred embodiments, it is understood that various modifications, substitutions, and changes can be made without departing from the spirit and scope of the invention. In the above embodiments, the present invention is applied to a system that deals with data representing audio signals, documents, or images (graphics images, still images, animations, movies). However, the present invention may also be applied to other various types of multimedia data and various combinations of these data. Furthermore, the method of detecting the frequency of audio data and the method of generating a reduced-size image are not limited to those described above, and various methods may be employed.

An icon may be automatically generated according to the present invention each time data is saved, or an icon may be generated according to the present invention only when an operator has specified a particular image and otherwise a predetermined icon may be used as in conventional techniques.

The present invention may be applied to a system comprising a plurality of devices or apparatus, and also to a system comprising only one device or apparatus. The present invention may also be applied to a system or apparatus that operates according to a supplied program.

As described above, the present invention provides icon images including information that represents characteristic features of files related to the corresponding icons so that files can be easily identified via icon images.

What is claimed is:

1. A multimedia file management method of managing a multimedia file including audio data, said method comprising:

an input step of inputting a multimedia file;

an identifying step of identifying a type of the multimedia file input in said input step as an audio data file, a text data file, or an image data file from identification information stored in the multimedia file;

a characteristic feature extraction step of, when the type of the multimedia file has been identified as an audio data file, extracting a part of said audio data according to an instruction issued by an operator; and a display step of displaying said extracted part of the audio data as an icon related to said multimedia file.

2. A multimedia file management method according to claim 1, wherein the icon is represented by an amplitude waveform, a sound pressure waveform, or a frequency distribution waveform of said extracted part of the audio data.

3. A multimedia file management method according to claim 1 or 2, wherein the icon is represented by a color or brightness corresponding to an amplitude, a frequency, or a distribution density of said extracted part of the audio data.

4. A multimedia file management method according to claim 3, wherein a multimedia name or a title of the multimedia file related to the icon in a one-to-one fashion is displayed together with the icon.

5. A multimedia file management method according to claim 4, wherein complementary image data is added to said extracted part of audio data so that the icon has a predetermined form.

6. A multimedia file management method according to claim 3, wherein complementary image data is added to said extracted part of audio data so that the icon has a predetermined form.

7. A multimedia file management method according to claim 2, wherein a multimedia file name or a title of the multimedia file related to the icon in a one-to-one fashion is displayed together with the icon.

8. A multimedia file management method according to claim 7, wherein complementary image data is added to said extracted part of audio data so that the icon has a predetermined form.

9. A multimedia file management method according to claim 2, wherein complementary image data is added to said extracted part of audio data so that the icon has a predetermined form.

10. A multimedia file management method according to claim 1, wherein a multimedia file name or a title of the multimedia file related to the icon in a one-to-one fashion is displayed together with the icon.

11. A multimedia file management method according to claim 10, wherein complementary image data is added to said extracted part of audio data so that the icon has a predetermined form.

12. A multimedia file management method according to claim 1, wherein complementary image data is added to said extracted part of audio data so that the icon has a predetermined form.

13. A multimedia file management system for managing a multimedia file including audio data, said system comprising:

input means for inputting a multimedia file;

identifying means for identifying a type of the multimedia file input by said input means as an audio data file, a text data file, or an image data file from identification information stored in the multimedia file;

characteristic feature extraction means for, when the type of the multimedia file has been identified as an audio data file, extracting a part of said audio data according to an instruction issued by an operator;

icon generating means for generating an icon related to said multimedia file, said icon including said extracted part of audio data;

icon management means for managing the icon generated by said icon generating means;

display means for displaying the icon managed by said icon management means; and selection means for selecting an arbitrary multimedia file via an icon displayed on said display means.

14. A multimedia file management system according to claim 13, wherein the icon is represented by an amplitude waveform, a sound pressure waveform, or a frequency distribution waveform of said extracted part of the audio data.

15. A multimedia file management system according to claim 13 or 14, wherein the icon is represented by a color or brightness corresponding to an amplitude, a frequency, or a distribution density of said extracted part of audio data.

16. A multimedia file management system according to claim 15, wherein a multimedia file name or a title of the multimedia file related to the icon in a one-to-one fashion is displayed together with the icon.

17. A multimedia file management system according to claim 16, wherein complementary image data is added to said extracted part of audio data so that the icon has a predetermined form.

18. A multimedia file management system according to claim 15, wherein complementary image data is added to said extracted part of audio data so that the icon has a predetermined form.

19. A multimedia file management system according to claim 14, wherein a multimedia file name or a title of the multimedia file related to the icon in a one-to-one fashion is displayed together with the icon.

20. A multimedia file management system according to claim 19, wherein complementary image data is added to said extracted part of audio data so that the icon has a predetermined form.

21. A multimedia file management system according to claim 14, wherein complementary image data is added to said extracted part of audio data so that the icon has a predetermined form.

22. A multimedia file management system according to claim 13, wherein a multimedia file name or a title of the multimedia file related to the icon in a one-to-one fashion is displayed together with the icon.

23. A multimedia file management system according to claim 22, wherein complementary image data is added to said extracted part of audio data so that the icon has a predetermined form.

24. A multimedia file management system according to claim 13, wherein complementary image data is added to said extracted part of audio data so that the icon has a predetermined form.

25. A multimedia file management method of managing various data in the form of a multimedia file, said method comprising:

an input step of inputting a multimedia file;

an identifying step of identifying a type of the multimedia file input in said input step as an audio data file, a text data file, or an image data file from identification information stored in the multimedia file;

a step in which, when the type of the multimedia file has been identified as an audio data file in said identifying step, a part of audio data displayed on display means is extracted and an icon is generated from the extract part of audio data;

a step in which, when the type of the multimedia file has been identified as a text data file in said identifying step, a part of text data displayed on display means is extracted and an icon is generated from the extracted part of text data; and a step in which, when the type of the multimedia file has been identified as an image data file in said identifying step, a part of image data displayed on display means is extracted and an icon is generated from the extracted part of image data.

26. A multimedia file management method according to claim 25, further comprising a step in which when the type of a file has been identified as a moving image data file in said identifying step, a part of moving image data displayed on display means is extracted and an icon is generated from the extracted part of moving image data.

27. A multimedia file management system according to claim 25 or 26, wherein the icon is represented by an amplitude waveform, a sound pressure waveform, or a frequency distribution waveform of said extracted part of the audio data.

28. A multimedia file management system according to claim 27, wherein the icon is represented by a color or brightness corresponding to an amplitude, a frequency, or a distribution density of said extracted part of audio data.

29. A multimedia file management system according to claim 28, wherein a multimedia file name or a title of the multimedia file related to the icon in a one-to-one fashion is displayed together with the icon.

30. A multimedia file management system according to claim 27, wherein a file name or a title of the file related to the icon in a one-to-one fashion is displayed together with the icon.

31. A multimedia file management system according to claim 26, wherein the icon is represented by a color or brightness corresponding to an amplitude, a frequency, or a distribution density of said extracted part of audio data.

32. A multimedia file management system according to claim 31, wherein a multimedia file name or a title of the multimedia file related to the icon in a one-to-one fashion is displayed together with the icon.

33. A multimedia file management system according to claim 26, wherein a multimedia file name or a title of the multimedia file related to the icon in a one-to-one fashion is displayed together with the icon.

34. A multimedia file management system according to claim 25, wherein the icon is represented by a color or brightness corresponding to an amplitude, a frequency, or a distribution density of said extracted part of audio data.

35. A multimedia file management system according to claim 34, wherein a multimedia file name or a title of the multimedia file related to the icon in a one-to-one fashion is displayed together with the icon.

36. A multimedia file management system according to claim 25, wherein a multimedia file name or a title of the multimedia file related to the icon in a one-to-one fashion is displayed together with the icon.

37. A multimedia file management system of managing various data in the form of a multimedia file, said system comprising:

input means for inputting a multimedia file;

identifying means for identifying a type of the multimedia file input by said input means as an audio data file, a text data file, or an image data file from identification information stored in the multimedia file;

means that, when the type of the multimedia file has been identified as an audio data file by said identifying means, extracts a part of audio data displayed on display means, and generates an icon from the extracted part of audio data;

means that, when the type of the multimedia file has been identified as a text data file by said identifying means, extracts a part of text data displayed on display means and generates an icon from the extract part of text data; and means that, when the type of the multimedia file has been identified as an image data multimedia file by said identifying means, extracts a part of image data displayed on display means and generates an icon from the extracted part of image data.

38. A multimedia file management method according to claim 37, further comprising means that, when the type of a multimedia file has been identified as a moving image data file by said identifying means, extracts a part of moving image data displayed on display means and generates an icon from the extracted part of moving image data.

39. A multimedia file management system according to claim 37 or 38, wherein the icon is represented by an amplitude waveform, a sound pressure waveform, or a frequency distribution waveform of said extracted part of the audio data.

40. A multimedia file management system according to claim 39, wherein the icon is represented by a color or brightness corresponding to an amplitude, a frequency, or a distribution density of said extracted part of the audio data.

41. A multimedia file management system according to claim 40, wherein a multimedia file name or a title of the multimedia file related to the icon in a one-to-one fashion is displayed together with the icon.

42. A multimedia file management system according to claim 39, wherein a multimedia file name or a title of the multimedia file related to the icon in a one-to-one fashion is displayed together with the icon.

43. A multimedia file management system according to claim 38, wherein the icon is represented by a color or brightness corresponding to an amplitude, a frequency, or a distribution density of said extracted part of the audio data.

44. A multimedia file management system according to claim 43, wherein a multimedia file name or a title of the multimedia file related to the icon in a one-to-one fashion is displayed together with the icon.

45. A multimedia file management system according to claim 38, wherein a multimedia file name or a title of the multimedia file related to the icon in a one-to-one fashion is displayed together with the icon.

46. A multimedia file management system according to claim 37, wherein the icon is represented by a color or brightness corresponding to an amplitude, a frequency, or a distribution density of said extracted part of the audio data.

47. A multimedia file management system according to claim 46, wherein a multimedia file name or a title of the multimedia file related to the icon in a one-to-one fashion is displayed together with the icon.

48. A multimedia file management system according to claim 37, wherein a multimedia file name or a title of the multimedia file related to the icon in a one-to-one fashion is displayed together with the icon.

* * * * *

UNITED STATES PATENT AND TRADEMARK OFFICE
CERTIFICATE OF CORRECTION

PATENT NO. : 5,680,558

DATED : October 31, 1997

INVENTOR(S): KOJI HATANAKA ET AL.

It is certified that error appears in the above-identified patent and that said Letters Patent is hereby corrected as shown below:

COLUMN 1

Line 35, "file," should read --file--; and
    "screen" should read --screen,--.

COLUMN 2

Line 50, "a" should be deleted.

COLUMN 5

Line 17, "10X240" should read --X240--;
  Line 56, "from" should be deleted;
  Line 56, "S14. In" should read S14.¶ In--.

COLUMN 6

Line 8, "S 12" should read --S12--.

COLUMN 7

Line 17, "name" should read --file name--.

COLUMN 8

Line 63, "extract" should read --extracted--.

UNITED STATES PATENT AND TRADEMARK OFFICE
CERTIFICATE OF CORRECTION

PATENT NO. : 5,680,558

DATED : October 31, 1997

INVENTOR(S): KOJI HATANAKA ET AL.

It is certified that error appears in the above-identified patent and that said Letters Patent is hereby corrected as shown below:

COLUMN 9

Line 1, "of" should read --of the--; and "on" should read --on the--.

COLUMN 10

Line 8, "extracts" should read --extracted--.

Signed and Sealed this

Twenty-eighth Day of July, 1998

Attest:

BRUCE LEHMAN

*Attesting Officer*     *Commissioner of Patents and Trademarks*